(12) United States Patent
Kendall et al.

(10) Patent No.: US 7,444,657 B2
(45) Date of Patent: Oct. 28, 2008

(54) EVENT MASKING FOR TELEVISION SIGNAL RECEIVER HAVING AN EMERGENCY ALERT FUNCTION

(75) Inventors: Scott Allan Kendall, Westfield, IN (US); Gavin Lee Johnston, Indianapolis, IN (US); John D Merrell, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 223 days.

(21) Appl. No.: 10/518,999

(22) PCT Filed: Jun. 26, 2003

(86) PCT No.: PCT/US03/20286

§ 371 (c)(1),
(2), (4) Date: Dec. 21, 2004

(87) PCT Pub. No.: WO2004/004308

PCT Pub. Date: Jan. 8, 2004

(65) Prior Publication Data

US 2005/0229207 A1    Oct. 13, 2005

Related U.S. Application Data

(60) Provisional application No. 60/391,911, filed on Jun. 27, 2002.

(51) Int. Cl.
*H04N 7/10* (2006.01)
*H04N 7/025* (2006.01)
*H04N 7/16* (2006.01)

(52) U.S. Cl. .............. 725/33; 725/32; 725/34; 725/35; 725/140; 725/152

(58) Field of Classification Search ............. 725/33–35, 725/140, 144, 151; 348/729
See application file for complete search history.

(56) References Cited

U.S. PATENT DOCUMENTS

| | | | |
|---|---|---|---|
| 5,121,430 A * | 6/1992 | Ganzer et al. ............... 380/258 |
| 5,565,909 A * | 10/1996 | Thibadeau et al. ............ 725/35 |
| 5,914,756 A | 6/1999 | Maeda et al. |
| 6,177,873 B1 | 1/2001 | Cragun |
| 6,204,761 B1 | 3/2001 | Vanderable |
| 6,271,893 B1 | 8/2001 | Kawaguchi et al. |
| 6,278,375 B1 | 8/2001 | Hucker |

(Continued)

OTHER PUBLICATIONS

Search Report Dated Dec. 12, 2003.

*Primary Examiner*—Hunter B. Lonsberry
(74) *Attorney, Agent, or Firm*—Joseph J. Laks; Robert D. Shedd; Brian J. Cromarty

(57) ABSTRACT

A television signal receiver having an emergency alert function provides a masked list of emergency events during a user setup process for the emergency alert function which makes the setup process easier for users, and also ensures that the emergency alert function will be activated when certain important emergency events occur. According to an exemplary embodiment, the television signal receiver includes a memory operative to store data associated with the emergency alert function. A processor is operative to receive an input representing a geographical area and to enable generation of a masked list of emergency events responsive to the input using the data in the memory. The masked list of emergency events represents a subset of all emergency events associated with the emergency alert function.

21 Claims, 6 Drawing Sheets

U.S. PATENT DOCUMENTS 6,313,887 B1 11/2001 Gudorf
6,543,051 B1 * 4/2003 Manson et al. ................ 725/33
7,113,107 B2 * 9/2006 Taylor ........................ 340/901
7,159,230 B2 * 1/2007 Manson et al. ................ 725/33

* cited by examiner

EVENT MASKING FOR TELEVISION SIGNAL RECEIVER HAVING AN EMERGENCY ALERT FUNCTION

This application claims the benefit, under 35 U.S.C. § 365 of International Application PCT/US03/20286 filed Jun. 26, 2003, which was published in accordance with PCT Article 21(2) on Jan. 8, 2004 in English and which claims the benefit of U.S. provisional patent application No. 60/391,911, filed Jun. 27, 2002.

The present invention generally relates to television signal receivers, and more particularly, to television signal receivers having an emergency alert function capable of, among other things, providing a masked list of emergency events which makes a setup process for the emergency alert function easier for users, and also ensures that the emergency alert function will be activated when certain important emergency events occur.

Emergency events such as severe weather, natural disasters, fires, civil emergencies, war acts, toxic chemical spills, radiation leaks, or other such conditions can be devastating to unprepared individuals. With weather-related emergencies, authorities such as the National Weather Service (NWS) and the National Oceanographic and Atmospheric Administration (NOAA) are generally able to detect severe weather conditions prior to the general public. Through the use of modern weather detection devices, such as Doppler radar and weather satellites, the NWS and NOAA are able to issue early warnings of severe weather conditions which have saved many lives. However, for such warnings to be effective, they must be communicated to their intended recipients.

Certain specialized radios and scanners are capable of receiving emergency alert signals provided by the NWS and NOAA. However, such devices tend to be dedicated to this use, and generally offer consumers little, if any, functionality beyond monitoring these signals. Accordingly, in order to receive advance warning of weather-related emergencies, consumers are required to purchase a separate, dedicated device, which may be cost-prohibitive to some consumers.

Certain such devices provide an emergency alert function using Specific Area Message Encoding (SAME) technology. Devices using SAME technology typically require a user to perform a setup process for the emergency alert function by selecting items such as one or more geographical areas of interest, and one or more types of emergency events which activate the emergency alert function. Once the setup process is complete, the emergency alert function may be activated when incoming emergency alert signals including SAME data indicate the occurrence of an emergency event which corresponds to the geographical area(s) and types of emergency event selected by the user during the setup process. When the emergency alert function is activated, an alert output such as an audio message may be provided to alert individuals of the emergency event.

One problem associated with devices using technology such as SAME technology involves the aforementioned setup process for the emergency alert function. As previously indicated, the setup process typically requires a user to select one or more types of emergency events which activate the emergency alert function. During the setup process, studies indicate that users tend to not select (e.g., turn off/disable) emergency events they do not understand, or emergency events they believe will seldom occur.

For example, an emergency event such as "EMERGENCY ACTION NOTIFICATION" may be provided as a user option during the setup process. Since the event name itself provides little indication of what this event refers to, users may not understand this event, and therefore may not select it as an event which activates the emergency alert function. However, this event is very important since it would occur if, for example, the United States was under attack or going to war.

As another example, an emergency event such as "FIRE WARNING" may be provided as a user option during the setup process. Users living in relatively moist climates may believe this event will seldom occur in their geographical area, and therefore may not select it as an event which activates the emergency alert function. However, fires may still be possible. Therefore, if a wide spread fire was to occur, it would be critical to notify people.

Accordingly, by not selecting such emergency events during the setup process due to a lack of understanding of the event or a belief that the event will seldom occur, users may not be informed if that event actually occurs. Therefore, a need exists for a device having an emergency alert function which avoids the foregoing problems. The present invention addresses these and other issues.

In accordance with an aspect of the present invention, a method for controlling a television signal receiver having an emergency alert function is disclosed. According to an exemplary embodiment, the method comprises steps of receiving an input representing a geographical area, and providing a masked list of emergency events responsive to the input, wherein the masked list of emergency events represents a subset of all emergency events associated with the emergency alert function.

In accordance with another aspect of the present invention, a television signal receiver having an emergency alert function is disclosed. According to an exemplary embodiment, the television signal receiver comprises memory means for storing data associated with the emergency alert function. Processing means receives an input representing a geographical area and enables generation of a masked list of emergency events responsive to the input using the data in the memory means. The masked list of emergency events represents a subset of all emergency events associated with the emergency alert function.

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

Figure 1:
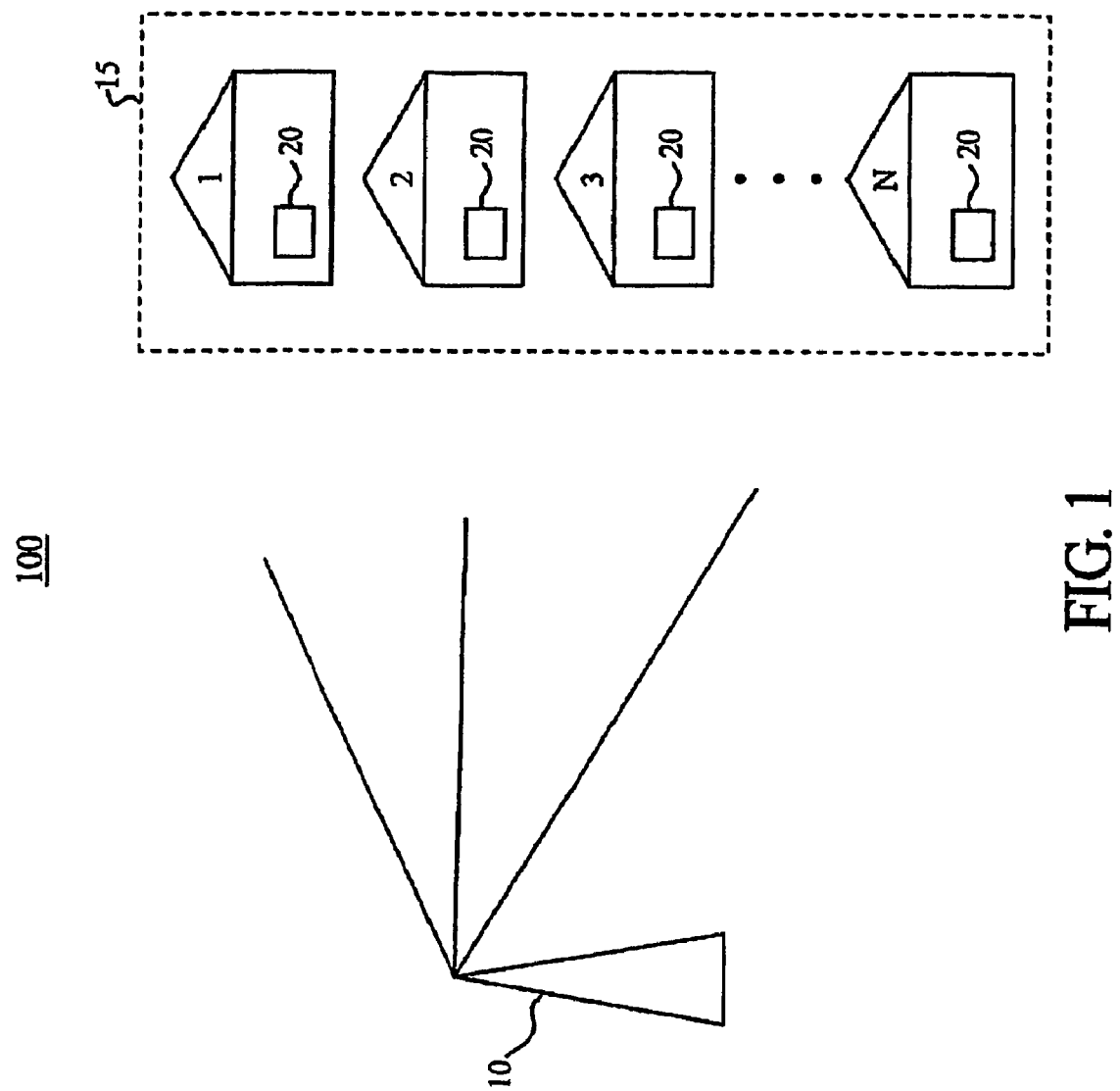
FIG. 1 is an exemplary environment suitable for implementing the present invention.

Referring now to the drawings, and more particularly to FIG. 1, an exemplary environment 100 suitable for implementing the present invention is shown. In FIG. 1, environment 100 comprises signal transmission means such as signal transmission source 10, dwelling means such as dwelling units 15 (i.e., 1, 2, 3 . . . N, where N may be any positive integer), and signal receiving means such as television signal receivers 20.

In FIG. 1, dwelling units 15 may represent residences, businesses and/or other dwelling places located within a particular geographical area, such as but not limited to, a particular continent, country, region, state, area code, zip code, city, county, municipality, subdivision, and/or other definable geographical area. According to an exemplary embodiment, each of the dwelling units 15 is equipped with at least one television signal receiver 20 having an emergency alert function. According to the present invention, the emergency alert function enables television signal receiver 20 to receive emergency alert signals and provide one or more alert outputs to notify individuals of an emergency event. As will be discussed later herein, television signal receiver 20 is also capable of providing an improved setup process for the emergency alert function which, among other things, ensures that the emergency alert function will be activated when certain important emergency events occur.

According to an exemplary embodiment, signal transmission source 10 transmits signals including emergency alert signals which may be received by each television signal receiver 20. The emergency alert signals may be provided from an authority such as the NWS, or other authorities such as governmental entities or the like. In response to the emergency alert signals, each television signal receiver 20 may provide one or more alert outputs to thereby notify individuals of the emergency event. Signal transmission source 10 may transmit such emergency alert signals to television signal receivers 20 via any wired or wireless link such as, but not limited to, terrestrial, cable, satellite, fiber optic, digital subscriber line (DSL), and/or any other type of broadcast and/or multicast means.

Figure 2:
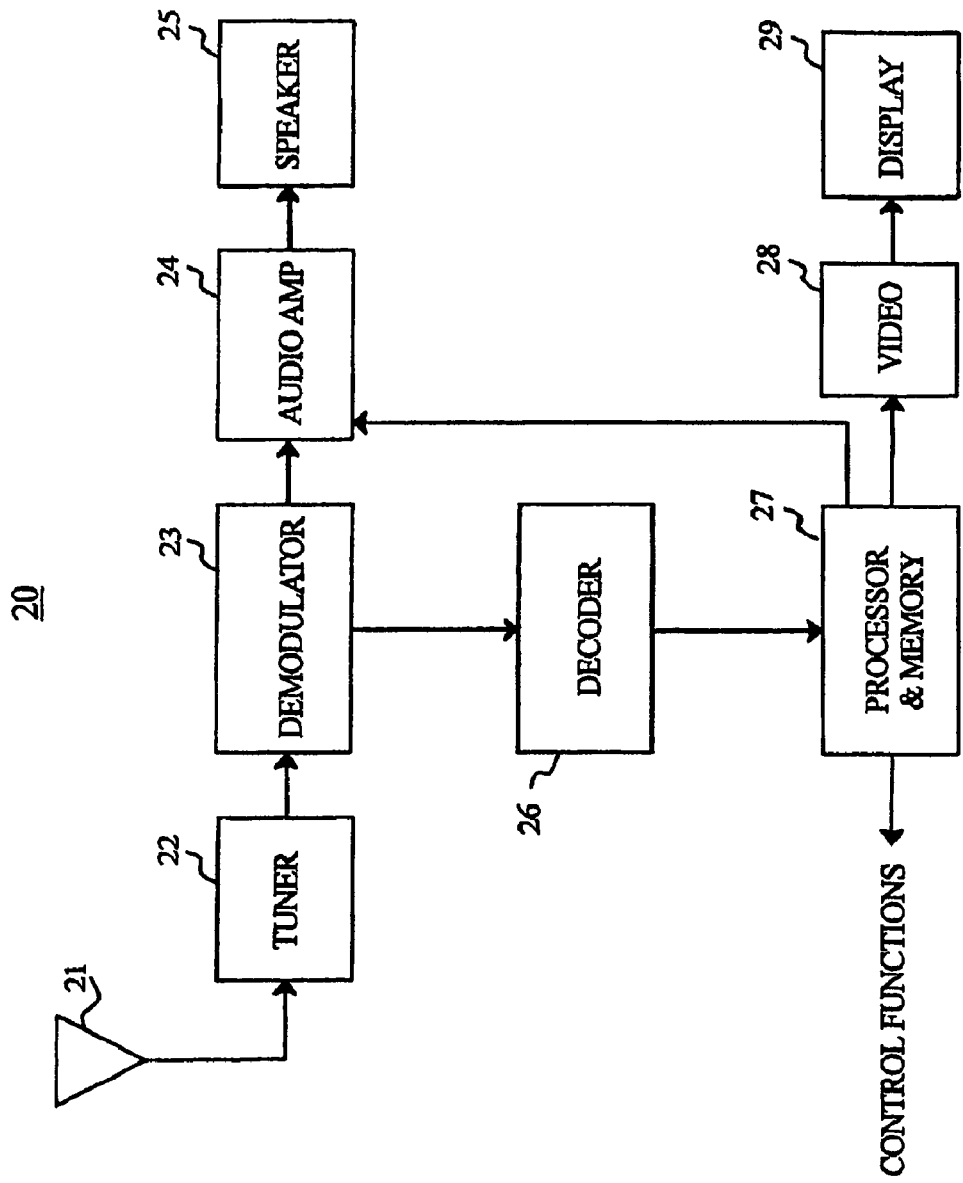
FIG. 2 is a block diagram of a television signal receiver according to an exemplary embodiment of the present invention.

Referring to FIG. 2, a block diagram of an exemplary embodiment of television signal receiver 20 of FIG. 1 is shown. In FIG. 2, television signal receiver 20 comprises signal receiving means such as signal receiving element 21, tuning means such as tuner 22, demodulation means such as demodulator 23, audio amplification means such as audio amplifier 24, audio output means such as speaker 25, decoding means such as decoder 26, processing means and memory means such as processor and memory 27, video processing means such as video processor 28, and visual output means such as display 29. Some of the foregoing elements may for example be embodied using integrated circuits (ICs). For clarity of description, certain conventional elements of television signal receiver 20 including control signals may not be shown in FIG. 2.

Signal receiving element 21 is operative to receive signals including audio and/or video signals from signal sources, such as signal transmission source 10 in FIG. 1. According to an exemplary embodiment, received audio signals may include digitally encoded emergency alert signals. Signal receiving element 21 may be embodied as any signal receiving element such as an antenna, input terminal or other element.

Tuner 22 is operative to tune signals including audio and/or video signals. According to an exemplary embodiment, tuner 22 is capable of tuning audio signals on at least the following designated NWS frequencies: 162.400 MHz, 162.425 MHz, 162.450 MHz, 162.475 MHz, 162.500 MHz, 162.525 MHz and 162.550 MHz. Other frequencies may also be tuned. As previously indicated herein, such audio signals may include digitally encoded emergency alert signals.

Demodulator 23 is operative to demodulate signals provided from tuner 22. According to an exemplary embodiment, demodulator 23 demodulates audio signals to thereby generate demodulated audio signals representing audio content such as an NWS audio message, a warning alert tone and/or other audio content. Audio amplifier 24 is operative to amplify the audio signals output from demodulator 23 responsive to a control signal provided from processor 27. Speaker 25 is operative to aurally output the amplified audio signals provided from audio amplifier 24.

Decoder 26 is operative to decode signals including audio and/or video signals. According to an exemplary embodiment, decoder 26 decodes audio signals provided from demodulator 23 to thereby extract digitally encoded frequency shift keyed (FSK) signals, which represent emergency alert signals indicating an emergency event. According to this exemplary embodiment, the emergency alert signals include data comprising SAME data associated with the emergency event. SAME data comprises a digital code representing information such as the specific geographical area affected by the emergency event, the type of emergency event (e.g., tornado watch, radiological hazard warning, civil emergency, etc.), and the expiration time of the event alert. SAME data is used by the NWS and other authorities to improve the specificity of emergency alerts and to decrease the frequency of false alerts. Other data and information may also be included in the emergency alert signals according to the present invention.

Processor and memory 27 are operative to perform various processing and data storage functions of television signal receiver 20. According to an exemplary embodiment, processor 27 receives the emergency alert signals from decoder 26 and determines whether the emergency alert function of television signal receiver 20 is activated based on data included in the emergency alert signals. According to this exemplary embodiment, processor 27 compares data in the emergency alert signals to user setup data and other data associated with masked events stored in memory 27 to determine whether the emergency alert function is activated. As will be described later herein, a setup process for the emergency alert function of television signal receiver 20 allows a user to select items such as an applicable geographical area(s), and type(s) of emergency events (e.g., tornado watch, radiological hazard warning, civil emergency, etc.) which activate the emergency alert function. Moreover, for each geographical area certain emergency events may be considered "asked events" and are not provided as user selections during the setup process, but rather are automatically selected by default. According to an exemplary embodiment, the emergency alert function is always activated when such masked events occur in their associated geographical area. Further details regarding these aspects of the present invention will be provided later herein.

When the emergency alert function of television signal receiver 20 is activated, processor 27 outputs one or more control signals which enable various operations. According to an exemplary embodiment, such control signals enable one or more alert outputs (e.g., aural and/or visual) to thereby notify individuals of the emergency event. Such control signals may also enable other operations of television signal receiver 20, such as causing it to be switched from an off/standby mode to an on mode.

Video processor 28 is operative to process signals including video signals. According to an exemplary embodiment, such video signals may include embedded messages such as NWS text messages and/or other messages that provide details regarding emergency events. Video processor 28 may include closed caption circuitry which enables closed caption displays. Display 29 is operative to provide visual displays corresponding to processed signals provided from video processor 28. According to an exemplary embodiment, display 29 may provide visual displays including the aforementioned messages that provide details regarding emergency events.

Figure 3:
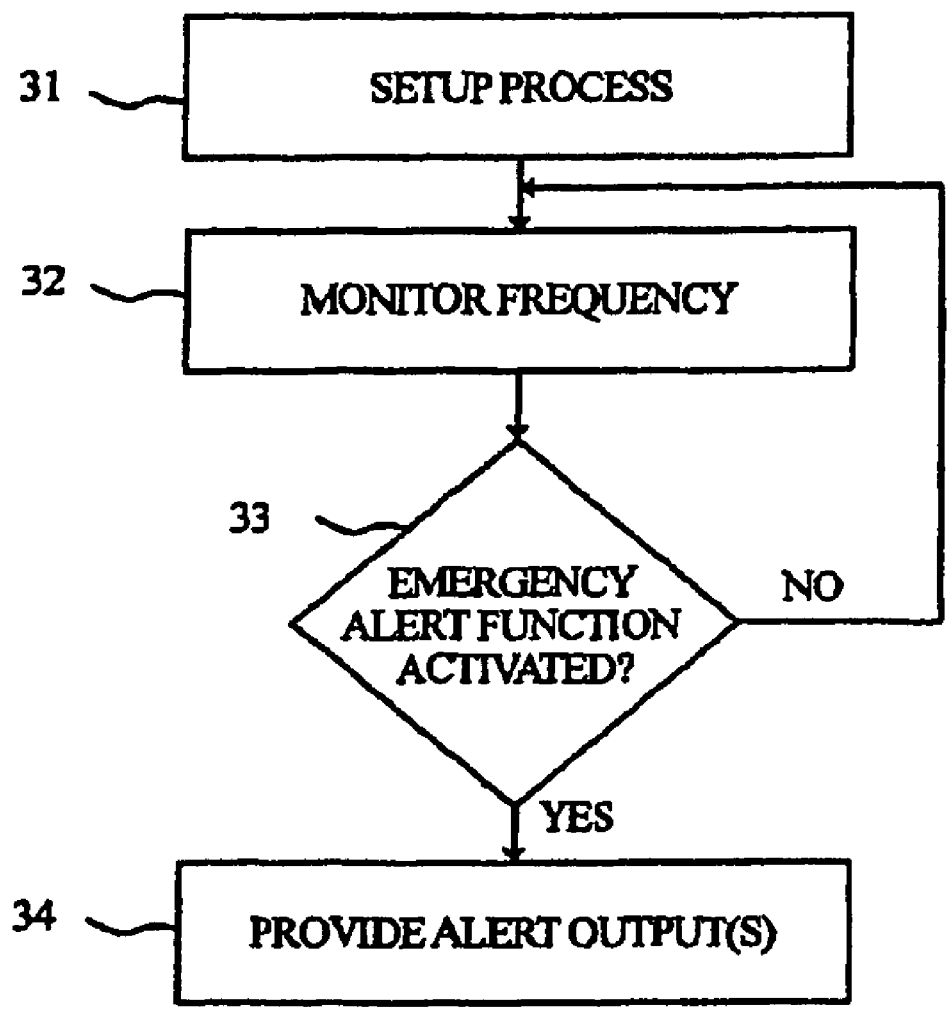
FIG. 3 is a flowchart illustrating exemplary steps according to the present invention.

Turning now to FIG. 3, a flowchart 30 illustrating exemplary steps according to the present invention is shown. For purposes of example and explanation, the steps of FIG. 3 will be described with reference to television signal receiver 20 of FIG. 2. The steps of FIG. 3 are merely exemplary, and are not intended to limit the present invention in any manner.

At step 31, a setup process for the emergency alert function of television signal receiver 20 is performed. According to an exemplary embodiment, a user performs this setup process by providing inputs to television signal receiver 20 (e.g., using a remote control device not shown) responsive to an on-screen menu displayed via display 29. Such an on-screen menu may for example be part of an electronic program guide (EPG) function of television signal receiver 20. According to an exemplary embodiment, the user may select at least the following items during the setup process at step 31:

A. Enable/Disable—The user may select whether to enable or disable the emergency alert function.
B. Frequency Selection—The user may select the monitoring frequency to tune to in order to receive emergency alert signals. For example, the user may select a frequency such as one of the following NWS transmission frequencies: 162.400 MHz, 162.425 MHz, 162.450 MHz, 162.475 MHz, 162.500 MHz, 162.525 MHz and 162.550 MHz.
C. Geographical Areas—The user may select one or more geographical areas of interest. For example, the user may select a particular continent, country, region, state, area code, zip code, city, county, municipality, subdivision, and/or other definable geographical area. According to an exemplary embodiment, such geographical area(s) may be represented in memory 27 by location data, such as one or more Federal Information Processing Standard (FIPS) location codes. Further details regarding item C of the setup process will also be provided later herein.
D. Event Types—The user may select one or more types of emergency events which activate the emergency alert function. For example, the user may designate that events such as civil emergencies, radiological hazard warnings, and/or tornado warnings activate the emergency alert function, but that events such as a thunderstorm watch does not, etc. The user may also select whether the conventional warning audio tone provided by the NWS and/or other alert mechanism activates the emergency alert function. According to the present invention, different severity or alert levels (e.g., statement, watch, warning, etc.) may represent different "events." For example, a thunderstorm watch may be considered a different event from a thunderstorm warning. Further details regarding item D of the setup process will also be provided later herein.
E. Alert Outputs—The user may select one or more alert outputs to be provided when the emergency alert function is activated. According to an exemplary embodiment, the user may select visual and/or aural outputs to be provided for each type of emergency event that activates the emergency alert function. For example, the user may select to display a visual message (e.g., an NWS text message as a closed caption display) and/or tune television signal receiver 20 to a specific channel. The user may also for example select to aurally output a warning tone (e.g., chime, siren, etc.) and/or an audio message (e.g., NWS audio message), and the desired volume of each. Moreover, the alert outputs may be selected on an event-by-event basis. Other types of alert outputs may also be provided according to the present invention.

According to the present invention, other menu selections may also be provided at step 31 and/or some of the menu selections described above may be omitted. Data corresponding to the user's selections during the setup process of step 31 is stored in memory 27.

Figure 4:
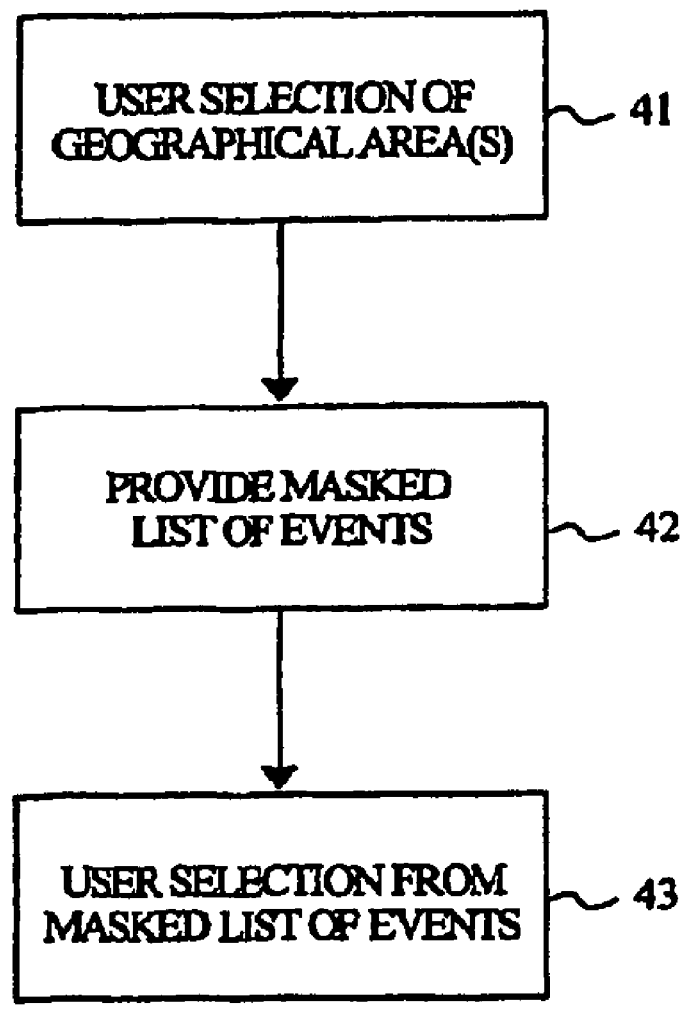
FIG. 4 is a flowchart illustrating further exemplary details of one of the steps of FIG. 3.

Referring now to FIG. 4, a flowchart 31 illustrating further exemplary details regarding items C and D of step 31 in FIG. 3 is provided. That is, flowchart 31 provides further exemplary details of the user setup process of step 31 for selecting one or more geographical areas of interest, and one or more types of emergency events which activate the emergency alert function. The steps of FIG. 4 are merely exemplary, and are not intended to limit the present invention in any manner.

At step 41, the user may select one or more geographical areas of interest. According to an exemplary embodiment, the user makes the selection at step 41 by providing an input to television signal receiver 20 (e.g., using a remote control device not shown) responsive to an on-screen menu displayed via display 29. Processor 27 receives the input and causes data corresponding to the user's selection at step 41 to be stored in memory 27.

At step 42, television signal receiver 20 provides a masked list of emergency events responsive to the user's selection at step 41. According to an exemplary embodiment, processor 27 enables generation of the masked list of emergency events for display via display 29 at step 42 using pre-programmed data stored in memory 27, as well as data in memory 27 corresponding to the user's selection at step 41. According to this exemplary embodiment, memory 27 stores pre-programmed data representing all geographical areas (e.g., all FIPS location codes) and all emergency events associated with the emergency alert function. Memory 27 also stores pre-programmed data indicating which emergency events, if any, are deemed "masked events" for each geographical area. Accordingly, when the user selects a geographical area at step 41, processor 27 accesses the pre-programmed data in memory 27 corresponding to the selected geographical area to thereby determine which emergency events are masked events for the selected geographical area. In this manner, processor 27 generates the masked list of events at step 42 such that it excludes the masked events. In other words, the masked list of emergency events includes all emergency events associated with the emergency alert function except the masked events. Accordingly, the masked list of emergency events represents a subset of all emergency events associated with the emergency alert function.

Figure 5:
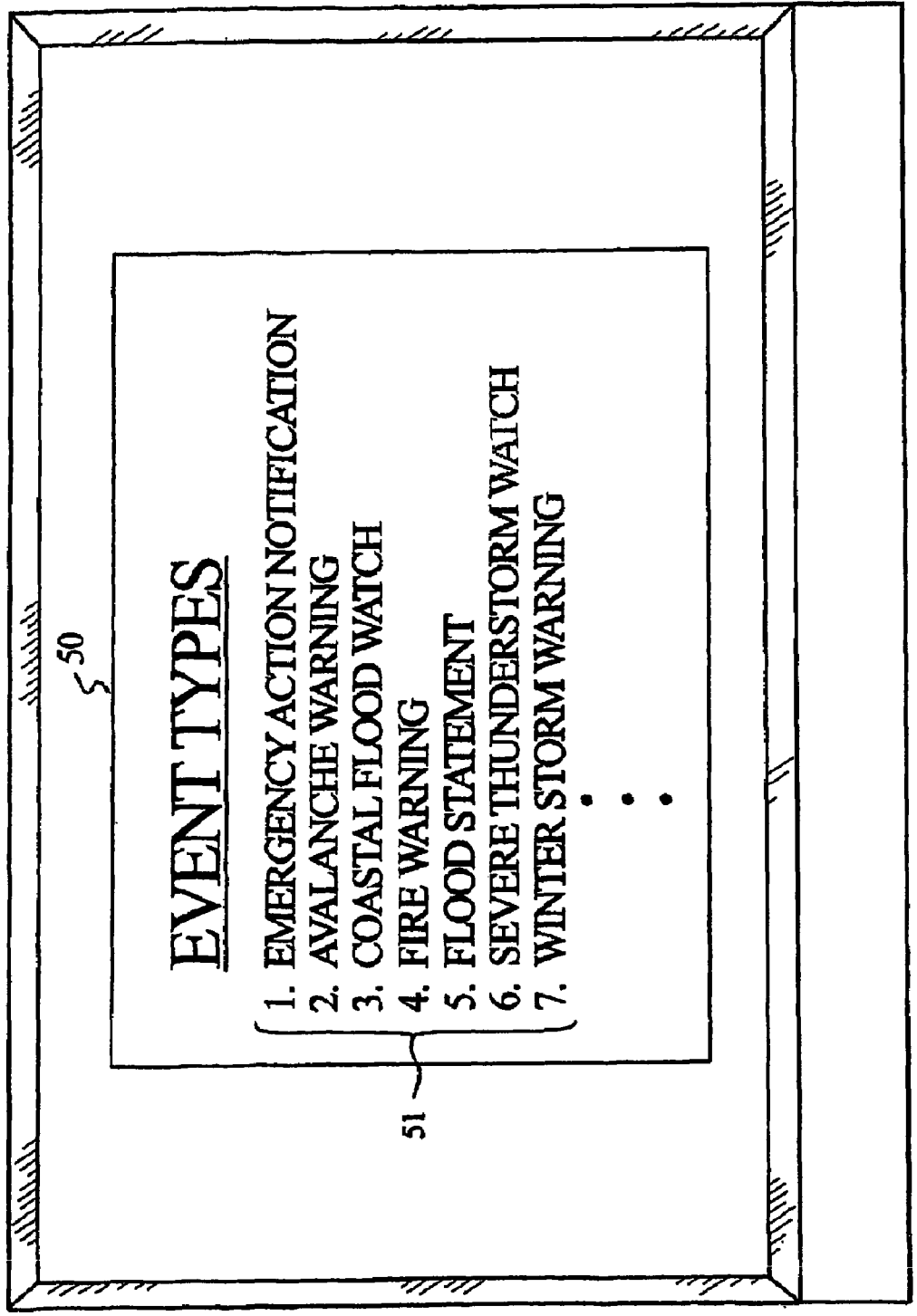
FIG. 5 is a diagram of a television signal receiver providing an unmasked list of emergency events.
Figure 6:
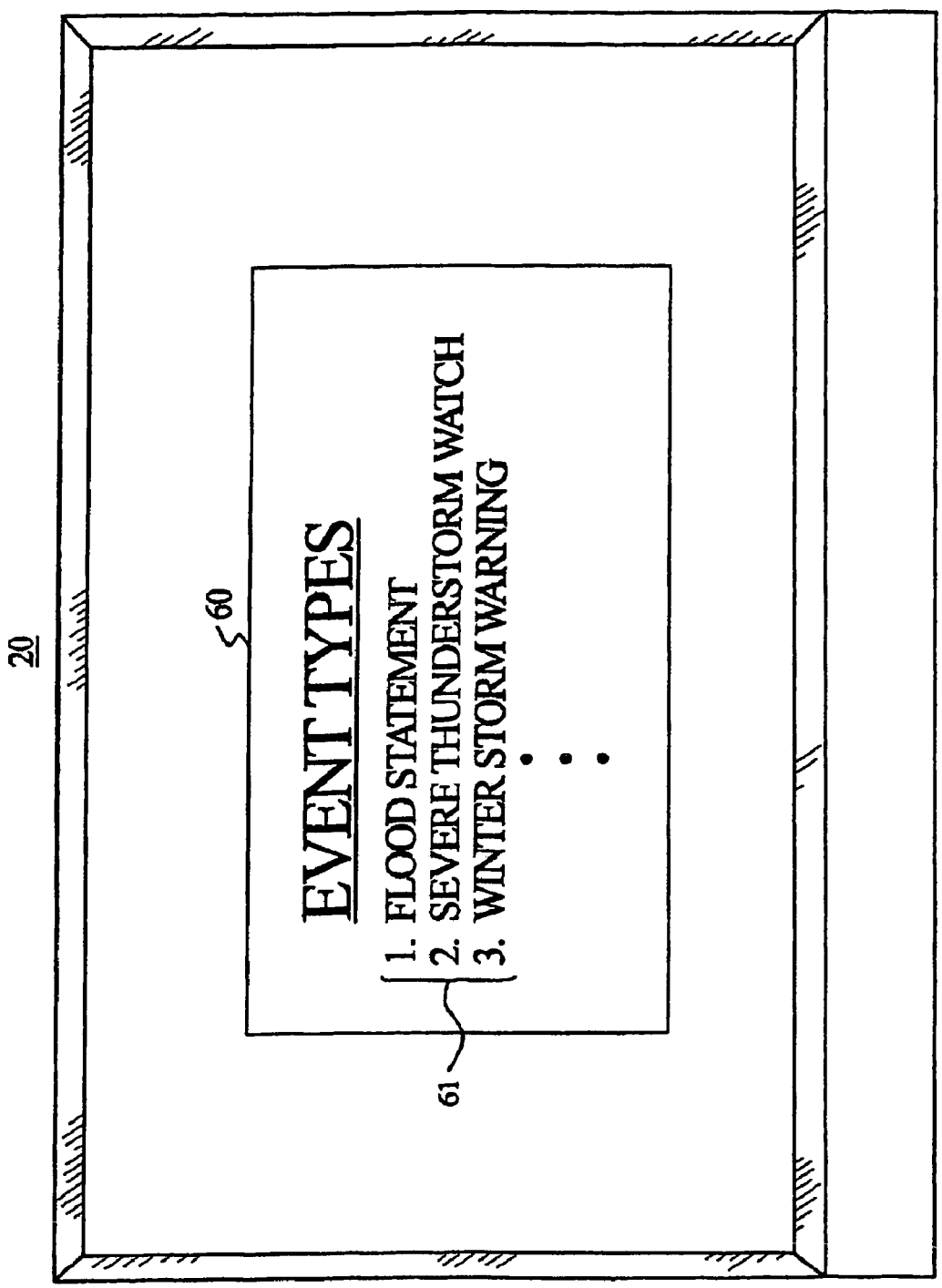
FIG. 6 is a diagram of a television signal receiver providing a masked list of emergency events according to an exemplary embodiment of the present invention.

FIGS. 5 and 6 illustrate an example of the difference between an unmasked list of emergency events and a masked list of emergency events. In particular, FIG. 5 is a diagram of television signal receiver 20 having an on-screen menu 50 providing an unmasked list of emergency events 51, which represents all of the emergency events associated with the emergency alert function. The number of emergency events associated with the emergency alert function, as well as the names of such events, may be a matter of design choice, and may for example be designated by a standard protocol such as one using SAME technology. According to an exemplary embodiment, there may be more than 50 different emergency events.

In contrast to FIG. 5, FIG. 6 is a diagram of television signal receiver 20 having an on-screen menu 60 providing a masked list of emergency events 61 according to an exemplary embodiment of the present invention. In particular, masked list of emergency events 61 in FIG. 6 represents a subset of unmasked list of emergency events 51 in FIG. 5.

Masked list of emergency events 61 in FIG. 6 may for example be provided at step 42 when the user selects Indianapolis, Ind. as the geographical area at step 41.

In FIG. 6, event 1 from FIG. 5 (i.e., "EMERGENCY ACTION NOTIFICATION") is masked since users may not know what this event actually refers to. Accordingly, users may not select this event during the setup process as an event which activates the emergency alert function since they do not know what the event is. However, this event is very important since it would occur if, for example, the United States was going to war. Also in FIG. 6, events 2 and 3 from FIG. 5 (i.e., "AVALANCHE WARNING" and "COASTAL FLOOD WATCH") are masked since there are no mountains or coast line close to Indiana. Therefore, an avalanche or coastal flood is impossible.

Event 4 from FIG. 5 (i.e., "FIRE WARNING") is also masked in FIG. 6 since fire in the Indianapolis area is very rare because of the moist climate. As a result, users may not select this event during the setup process as an event which activates the emergency alert function. However, fires may still be possible. Therefore, if a wide spread fire was to occur, it would be critical to notify people. The details shown in FIGS. 5 and 6 are examples only, and are not intended to limit the present invention in any manner. In practice, the determination of what events constitute a masked event for a given geographical area is a matter of design choice.

The masked list of emergency events provided at step 42 may be responsive to the user selecting a plurality of geographical areas at step 41. According to an exemplary embodiment, when the user selects a plurality of geographical areas at step 41, processor 27 generates the masked list of events at step 42 from data in memory 27 using a logical OR operation. Further details regarding this technique for generating the masked list of events will now be provided with reference to Table 1 below.

TABLE 1

| FIPS Location Code | Avalanche Warning | Blizzard Warning | Flash Flood Statement | Hurricane Watch | Tornado Warning | Volcano Warning |
|---|---|---|---|---|---|---|
| 018067 | 0 | 1 | 1 | 0 | 1 | 0 |
| 045019 | 0 | 0 | 1 | 1 | 1 | 0 |
| 012086 | 0 | 0 | 1 | 1 | 0 | 0 |
| Logical OR | 0 | 1 | 1 | 1 | 1 | 0 |

Table 1 illustrates event masking data for 3 exemplary geographical areas and 6 exemplary emergency events. In Table 1, the 3 geographical areas are represented as FIPS location codes for Indianapolis, Ind. (i.e., 018067); Charleston, S.C. (i.e., 045019); and Miami, Fla. (i.e., 012086). These geographical areas are used only for purposes of example, and to illustrate principles of the present invention. In practice, such geographical areas generally must be within a predetermined distance from a particular transmitter.

In Table 1, a logical "0" entry indicates a masked event while a logical "1" entry indicates a revealed or unmasked event. Accordingly, each of the 3 geographical areas in Table 1 includes masked events. Table 1 may for example represent the manner in which pre-programmed data is stored in memory 27 to indicate which emergency events are considered "masked events" for each geographical area. As indicated in Table 1, the masked list of events may be generated using a logical OR operation when a plurality of geographical areas are selected by the user at step 41. Accordingly, if the user selects the 3 geographical areas represented in Table 1 at step 41, then the logical OR operation produces a masked list of emergency events that includes all of the events, except the events "AVALANCHE WARNING" and "VOLCANO WARNING." In this manner, when the user selects a plurality of geographical areas at step 41, the masked list of emergency events is generated at step 42 such that it excludes the masked events common to all of the geographical areas. According to the present invention, other techniques may also be used for generating a masked list of emergency events when more than one geographical area is selected by the user at step 41.

At step 43, the user may select one or more emergency events from the masked list of events. According to an exemplary embodiment, the user makes the selection at step 43 by providing an input to television signal receiver 20 (e.g., using a remote control device not shown) responsive to an on-screen menu, such as menu 60 of FIG. 6, displayed via display 29. According to this exemplary embodiment, masked events are automatically selected by default and are not presented for user selection. Accordingly, the setup process for the emergency alert function is simplified since the user must consider a fewer number of events. Data corresponding to the user's selection at step 43 is stored in memory 27 under the control of processor 27.

Referring back to FIG. 3, at step 32 television signal receiver 20 monitors the frequency selected by the user during the setup process of step 31 (i.e., item B) for emergency alert signals. According to an exemplary embodiment, tuner 22 monitors the selected frequency and thereby receives incoming emergency alert signals. According to the present invention, television signal receiver 20 is capable of monitoring a frequency and receiving emergency alert signals during all modes of operation, including for example when television signal receiver 20 is turned on, turned off, and/or during playback of recorded audio and/or video content.

At step 33, a determination is made as to whether the emergency alert function of television signal receiver 20 is activated. According to an exemplary embodiment, processor 27 makes this determination by comparing data included in the incoming emergency alert signals to data stored in memory 27. As previously indicated herein, the emergency alert signals may include data such as SAME data which represents information including the type of emergency event (e.g., tornado watch, radiological hazard warning, civil emergency, etc.) and the specific geographical area(s) affected by the emergency event. According to an exemplary embodiment, processor 27 compares this SAME data to corresponding user setup data (i.e., items C and D of step 31) and data representing masked events stored in memory 27 to thereby determine whether the emergency alert function is activated. In this manner, the emergency alert function of television signal receiver 20 is activated when the emergency event indicated by the emergency alert signals corresponds to: (1) the geographical area(s) selected by the user for item C of step 31 (i.e., step 41 in FIG. 4); and (2) a masked event, or the event type(s) selected by the user for item D of step 31 (i.e., step 43 in FIG. 4).

If the determination at step 33 is negative, process flow loops back to step 32 where tuner 22 continues to monitor the selected frequency. Alternatively, if the determination at step 33 is positive, process flow advances to step 34 where television signal receiver 20 provides one or more alert outputs to thereby notify individuals of the emergency event.

According to an exemplary embodiment, processor 27 enables the one or more alert outputs at step 34 in accordance with the user's selections during the setup process of step 31 (i.e., item E), and such alert outputs may be aural and/or visual in nature. For example, aural outputs such as a warning tone and/or an NWS audio message may be provided at step 34 via speaker 25, and the volume of such aural outputs may be controlled in accordance with the volume level set by the user during the setup process of step 31. Visual outputs may also be provided at step 34 via display 29 to notify individuals of the emergency event. According to an exemplary embodiment, an auxiliary information display such as an NWS text message (e.g., as a closed caption display) and/or a video output from a specific channel may be provided at step 34 via display 29 under the control of processor 27.

According to another exemplary embodiment, the alert output(s) provided at step 34 may be based on the severity or alert level of the particular emergency event. For example, emergency events may be classified in one of three different alert level categories, such as statement, watch, and warning. With such a classification scheme, the alert output for an emergency event at a level 1 or statement level may be provided by an unobtrusive notification means such as a blinking light emitting diode (LED) since it is the least severe type of emergency event. The alert output for an emergency event at a level 2 or watch level may have some type of audio component (e.g., radio message). The alert output for an emergency event at a level 3 or warning level may be provided by a siren or other type of alarm since it is the most severe type of emergency event. Other types of aural and/or visual alert outputs than those expressly described herein may also be provided at step 34 according to the present invention.

As described herein, the present invention provides a television signal receiver having an emergency alert function capable of, among other things, providing a masked list of emergency events which makes a setup process for the emergency alert function easier for users, and also ensures that the emergency alert function will be activated when any masked event or user selected event occurs. The present invention may be applicable to various apparatuses, either with or without a display device. Accordingly, the phrase "television signal receiver" as used herein may refer to systems or apparatuses capable of receiving and processing television signals including, but not limited to, television sets, computers or monitors that include a display device, and systems or apparatuses such as set-top boxes, video cassette recorders (VCRs), digital versatile disk (DVD) players, video game boxes, personal video recorders (PVRs), computers or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for controlling a television signal receiver having an emergency alert function, comprising:
   receiving an input representing a geographical area;
   providing a masked list of emergency events selectable by the user of the television signal receiver responsive to the input, wherein the masked list of emergency events represents a subset of all emergency events associated with the emergency alert function excluding masked events associated with the input geographical area; and
   setting the masked events for default notification.

2. The method of claim 1, wherein the geographical area is represented by a FIPS location code.

3. The method of claim 1, further comprised of enabling a user to select an emergency event from the masked list of emergency events.

4. The method of claim 3, further comprised of:
   receiving emergency alert signals indicating an occurrence of the selected emergency event; and
   providing an alert output responsive to the emergency alert signals.

5. The method of claim 1, further comprised of:
   receiving emergency alert signals indicating an occurrence of an emergency event not included in the masked list of emergency events; and
   providing an alert output responsive to the emergency alert signals.

6. The method of claim 1, wherein:
   the received input represents a plurality of geographical areas;
   each of the geographical areas includes at least one masked event; and
   the masked list of emergency events excludes masked events common to all of the plurality of geographical areas.

7. The method of claim 6, wherein the plurality of geographical areas are represented by a corresponding plurality of FIPS location codes.

8. A television signal receiver having an emergency alert function, comprising;
   a memory operative to store data associated with the emergency alert function; and
   a processor operative to receive an input representing a geographical area and enable generation of a masked list of emergency events selectable by the user of the television signal receiver responsive to the input using the data in the memory, wherein the masked list of emergency events represents a subset of all emergency events associated with the emergency alert function excluding masked events associated with the input geographical area, where the masked events are set for default notification.

9. The television signal receiver of claim 8, wherein the geographical area is represented by a FIPS location code.

10. The television signal receiver of claim 8, wherein a user selects an emergency event from the masked list of emergency events.

11. The television signal receiver of claim 10, further comprising:
    a tuner operative to tune a frequency including emergency alert signals indicating an occurrence of the selected emergency event; and
    wherein the processor enables an alert output responsive to the emergency alert signals.

12. The television signal receiver of claim 8, further comprising:
    a tuner operative to tune a frequency including emergency alert signals indicating an occurrence of an emergency event not included in the masked list of emergency events; and
    wherein the processor enables an alert output responsive to the emergency alert signals.

13. The television signal receiver of claim 8, wherein:
    the input received by the processor represents a plurality of geographical areas and each of the geographical areas includes at least one masked event; and
    the masked list of emergency events excludes masked events common to all of the plurality of geographical areas.

14. The television signal receiver of claim 13, wherein the plurality of geographical areas are represented by a corresponding plurality of FIPS location codes.

15. A television signal receiver having an emergency alert function, comprising:

memory means for storing data associated with the emergency alert function; and processing means for receiving an input representing a geographical area and enabling generation of a masked list of emergency events selectable by the user of the television signal receiver responsive to the input using the data in the memory means, wherein the masked list of emergency events represents a subset of all emergency events associated with the emergency alert function excluding masked events associated with the input geographical area, where the masked events are set for default notification.

16. The television signal receiver of claim 15, wherein the geographical area is represented by a FIPS location code.

17. The television signal receiver of claim 15, wherein a user selects an emergency event from the masked list of emergency events.

18. The television signal receiver of claim 17, further comprising:

tuning means for tuning a frequency including emergency alert signals indicating an occurrence of the selected emergency event; and wherein the processing means enables an alert output responsive to the emergency alert signals.

19. The television signal receiver of claim 15, further comprising:

tuning means for tuning a frequency including emergency alert signals indicating an occurrence of an emergency event not included in the masked list of emergency events; and wherein the processing means enables an alert output responsive to the emergency alert signals.

20. The television signal receiver of claim 15, wherein:

the input received by the processing means represents a plurality of geographical areas and each of the geographical areas includes at least one masked event; and the masked list of emergency events excludes masked events common to all of the plurality of geographical areas.

21. The television signal receiver of claim 20, wherein the plurality of geographical areas are represented by a corresponding plurality of FIPS location codes.

* * * * *